United States Patent
Chae

(10) Patent No.: US 11,025,334 B2
(45) Date of Patent: Jun. 1, 2021

(54) METHOD AND DEVICE FOR PERFORMING RELAY D2D COMMUNICATION IN WIRELESS COMMUNICATION SYSTEM

(71) Applicant: LG ELECTRONICS INC., Seoul (KR)

(72) Inventor: Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 30 days.

(21) Appl. No.: 16/479,408

(22) PCT Filed: Jan. 22, 2018

(86) PCT No.: PCT/KR2018/000942
§ 371 (c)(1),
(2) Date: Jul. 19, 2019

(87) PCT Pub. No.: WO2018/135913
PCT Pub. Date: Jul. 26, 2018

(65) Prior Publication Data
US 2019/0363779 A1 Nov. 28, 2019

Related U.S. Application Data

(60) Provisional application No. 62/448,917, filed on Jan. 20, 2017.

(51) Int. Cl.
*H04W 8/00* (2009.01)
*H04B 7/14* (2006.01)
(Continued)

(52) U.S. Cl.
CPC .............. *H04B 7/14* (2013.01); *A01D 3/04* (2013.01); *H04B 17/318* (2015.01); *H04W 8/005* (2013.01); *H04W 88/04* (2013.01)

(58) Field of Classification Search
CPC ....... H04B 7/14; H04B 17/318; H04W 88/04; H04W 8/005
See application file for complete search history.

(56) References Cited

U.S. PATENT DOCUMENTS

2010/0014463 A1* 1/2010 Nagai ............... H04W 72/0426
370/328
2015/0257187 A1* 9/2015 Kwon .................. H04W 72/04
370/329

FOREIGN PATENT DOCUMENTS

KR 10-2016-0064172 A 6/2016
WO 2016/153807 A1 9/2016
(Continued)

OTHER PUBLICATIONS

ZTE: "Discussion on layer 2 ProSe UE-to-network relay for feD2D", R2-168147, 3GPP TSG RAN WG2 Meeting #96, Reno, USA, Nov. 14-18, 2016.
(Continued)

*Primary Examiner* — Jamal Javaid
(74) *Attorney, Agent, or Firm* — Dentons US LLP

(57) ABSTRACT

Disclosed according to various embodiments of the present invention are a method and a device for preforming device-to-device (D2D) relay communication. Disclosed are a method and a device for performing device-to-device (D2D) relay communication, the method comprising the steps of: receiving, from second UE, a signal including relay request information; transmitting a response signal to the second UE if destination UE corresponding to destination UE ID included in the relay request information has been found; and transmitting a relay signal to the destination UE.

11 Claims, 11 Drawing Sheets

(a)

(b)

(51) Int. Cl.
*H04B 17/318* (2015.01)
*A01D 3/04* (2006.01)
*H04W 88/04* (2009.01)

(56) References Cited

FOREIGN PATENT DOCUMENTS

| WO | WO-2016153807 A1 * | 9/2016 | ............ H04W 48/14 |
| WO | 2016/182294 A1 | 11/2016 | |

OTHER PUBLICATIONS

Nokia: "Discussion on adaptation layer for FeD2D", R2-168399, 3GPP TSG RAN WG2 Meeting #96, Reno, USA, Nov. 14-18, 2016.

* cited by examiner

FIG. 5
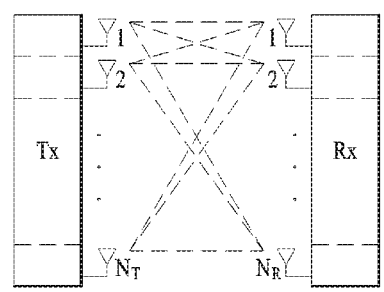
(a)
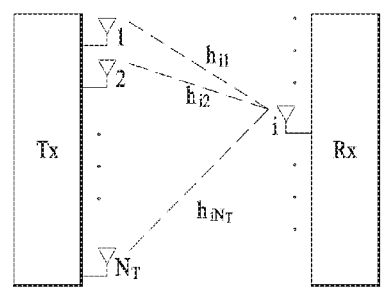
(b)

METHOD AND DEVICE FOR PERFORMING RELAY D2D COMMUNICATION IN WIRELESS COMMUNICATION SYSTEM

This application is a 35 USC § 371 National Stage entry of International Application No. PCT/KR2018/000942, filed on Jan. 22, 2018, which claims priority to U.S. Provisional Application No. 62/488,917, filed on Jan. 20, 2017, all of which are incorporated by reference in their entirety herein.

TECHNICAL FIELD

The present disclosure relates to a wireless communication system, and more particularly, to a method and device for performing relay D2D communication based on relay request information and a discovery signal.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

The object of the present disclosure is to provide a method of handling a relay request to a destination UE and performing relaying based on relay request information and a discovery signal.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided herein is a method of performing device-to-device (D2D) relay communication. The method may include receiving a signal including relay request information from a second user equipment (UE), when a destination UE corresponding to a destination UE ID included in the relay request information is discovered, transmitting a response signal to the second UE, and transmitting a relay signal to the destination UE.

According to an embodiment of the present disclosure, the relay request information may further include information on a request wait time, and the first UE may determine whether the destination UE is discovered during the request wait time.

According to an embodiment of the present disclosure, when detecting a discovery signal including a UE ID identical to the destination UE ID, the first UE may determine that the destination UE is discovered.

According to an embodiment of the present disclosure, when a relay request signal transmitted from the second UE is received in response to the response signal, the relay signal may be transmitted to the destination UE.

According to an embodiment of the present disclosure, the relay request signal may include information on a transmission resource for transmitting the relay signal.

According to an embodiment of the present disclosure, the relay request information may include information on at least one of a beam, an antenna, and an antenna group of the destination UE.

According to an embodiment of the present disclosure, the signal may include a first field indicating whether the relay information is included.

According to an embodiment of the present disclosure, when the first field is set to a first value, the relay request information includes the destination UE ID that the second UE desires to discover, and when the first field is set to a second value, the relay request information may include an ID of the second UE.

According to an embodiment of the present disclosure, when the first field is set to a second value, the response signal may not be transmitted to the second UE.

According to an embodiment of the present disclosure, the response signal may further include signal quality information including at least one of reference signal received power (RSRP) and reference signal received quality (RSRQ) of a signal related to the discovered destination UE.

According to an embodiment of the present disclosure, the signal transmitted from the second UE may correspond to a discovery signal.

According to an embodiment of the present disclosure, the signal may be beamformed in a specific direction and transmitted.

According to an embodiment of the present disclosure, the method may further include measuring a discovery channel busy ratio (DCBR) indicating a ratio of resources on which discovery signals are received in each signal direction and determining a transmission direction of a discovery signal based on the DCBR. Or, according to an embodiment of the present disclosure, the UE is configured to receive a user input to switch the drive mode from an autonomous mode to a manual mode, or to switch from a manual mode to an autonomous mode.

Advantageous Effects

According to the present disclosure, a UE can monitor whether a destination UE is discovered based on relay request information and a discovery signal and perform relaying when the destination UE is discovered.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 5 is a view illustrating the configuration of a wireless communication system having multiple antennas;

BEST MODE

Figure 1:
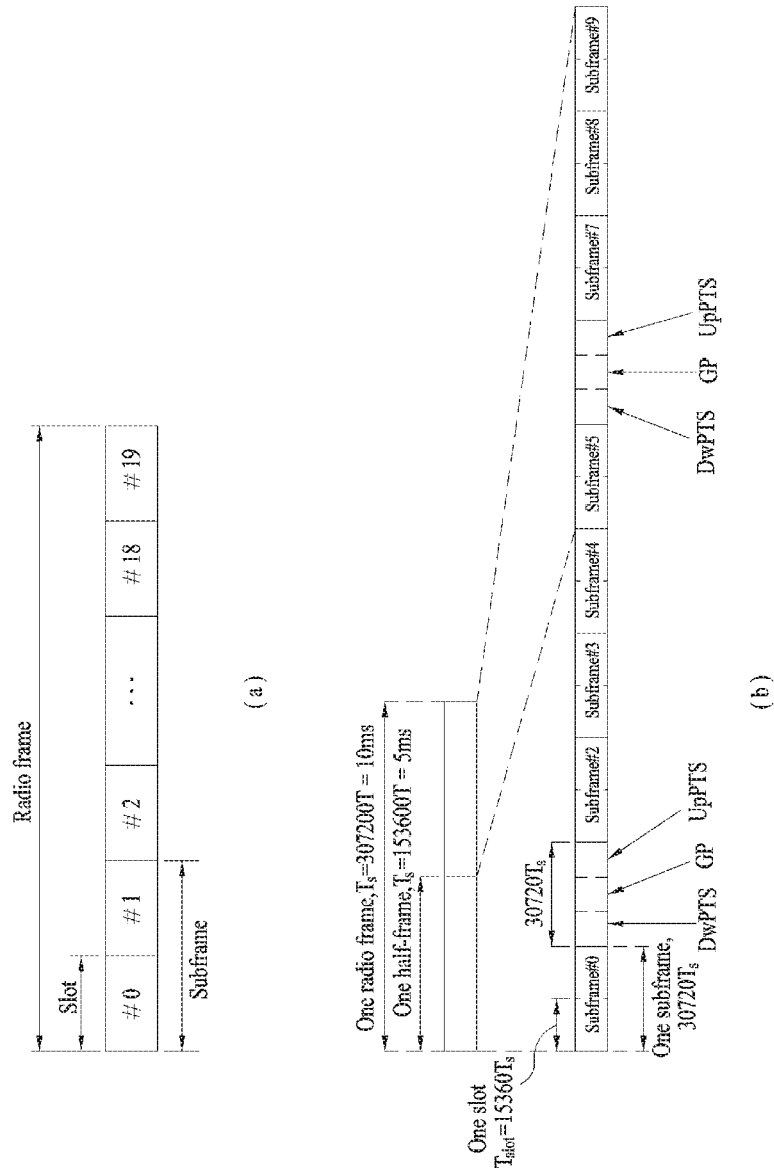
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased, and thus, the number of OFDM symbols in a slot is smaller than in the case of the normal CP. Thus, when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
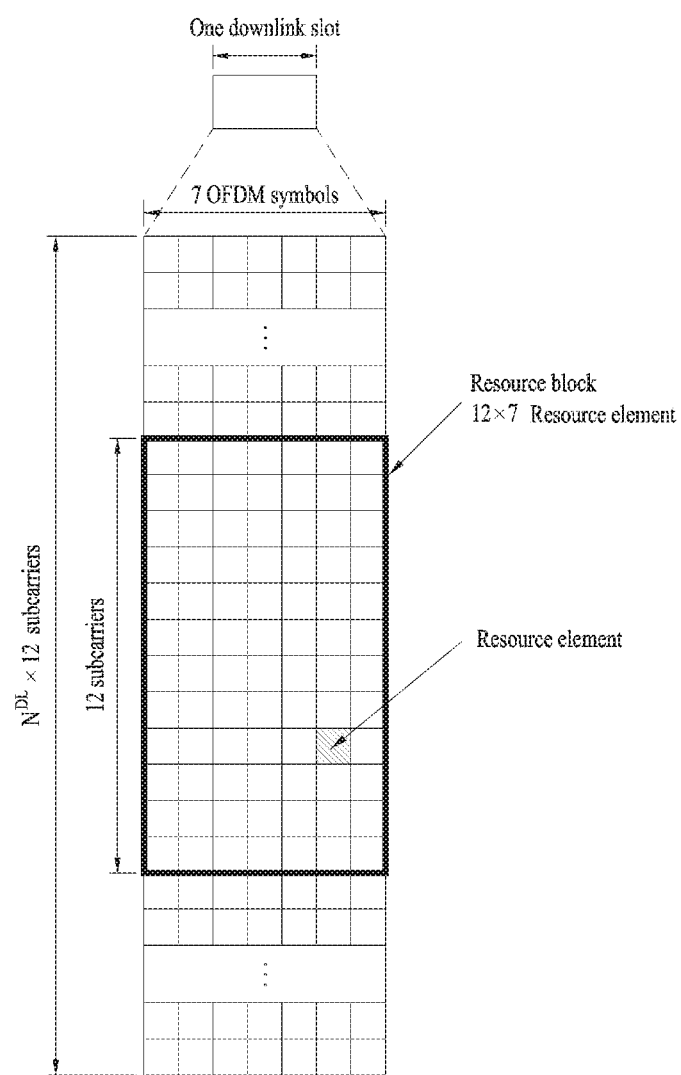
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
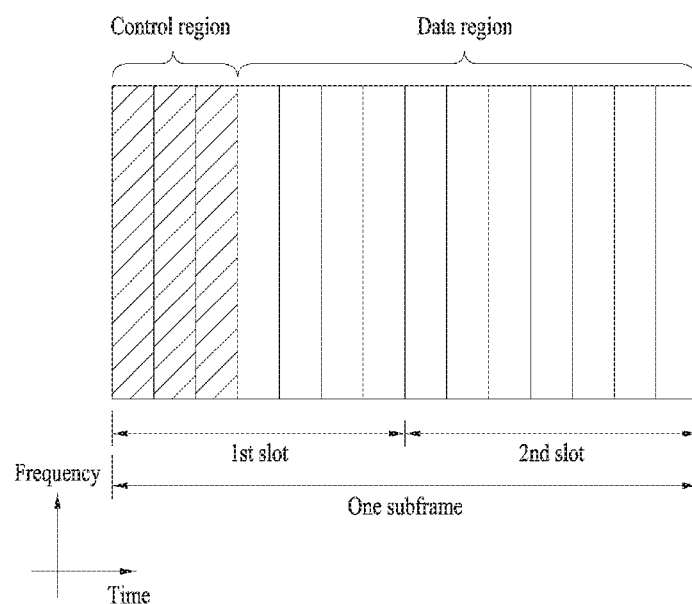
FIG. 3 is a view illustrating the structure of a downlink subframe.

FIG. 3 illustrates the structure of a downlink subframe. Up to three O1-DM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
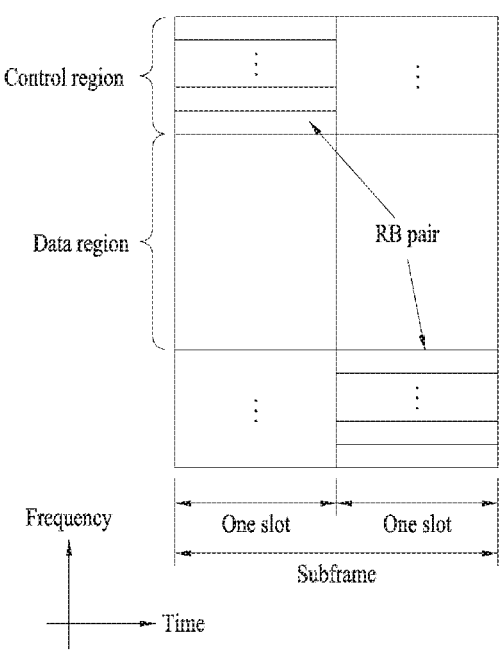
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus, it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \quad \text{[Equation 5]}$$

$$\begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad [5]$$

In Equation 5, $W_{ij}$ denotes a weight between an $i^{th}$ Tx antenna and $j^{th}$ information. W is also called a precoding matrix.

If the $N_R$ Rx antennas are present, respective received signals $y_1, y_2, \ldots y_{N_R}$ of the antennas can be expressed as follows.

$$y = [y_1, y_2, \ldots, y_{N_R}]^T \qquad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}] \qquad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \qquad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n = [n_1, n_2, \ldots, n_{N_R}]^T \qquad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \qquad \text{[Equation 10]}$$

$$\begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \qquad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
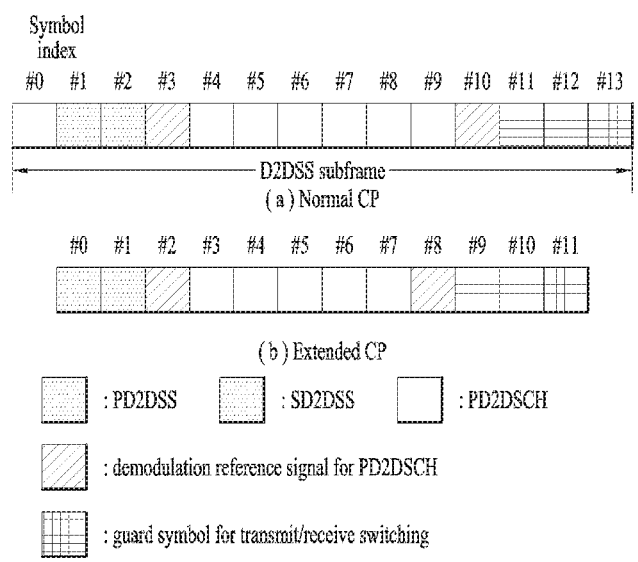
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
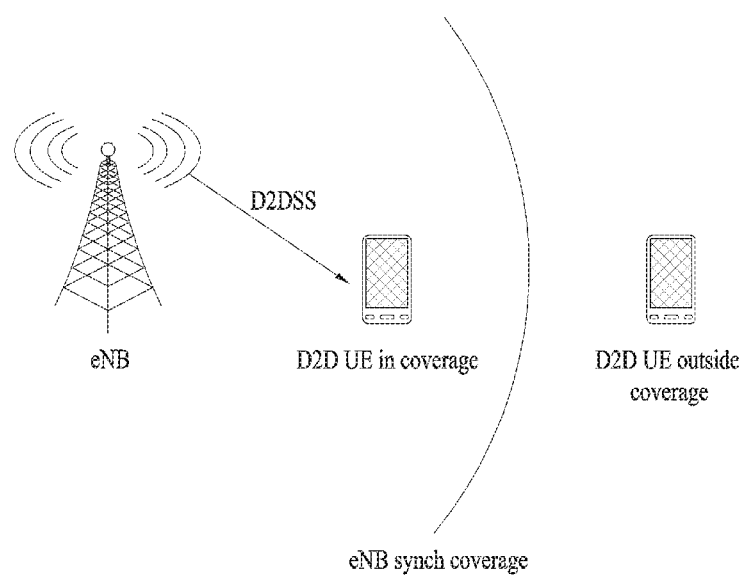
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
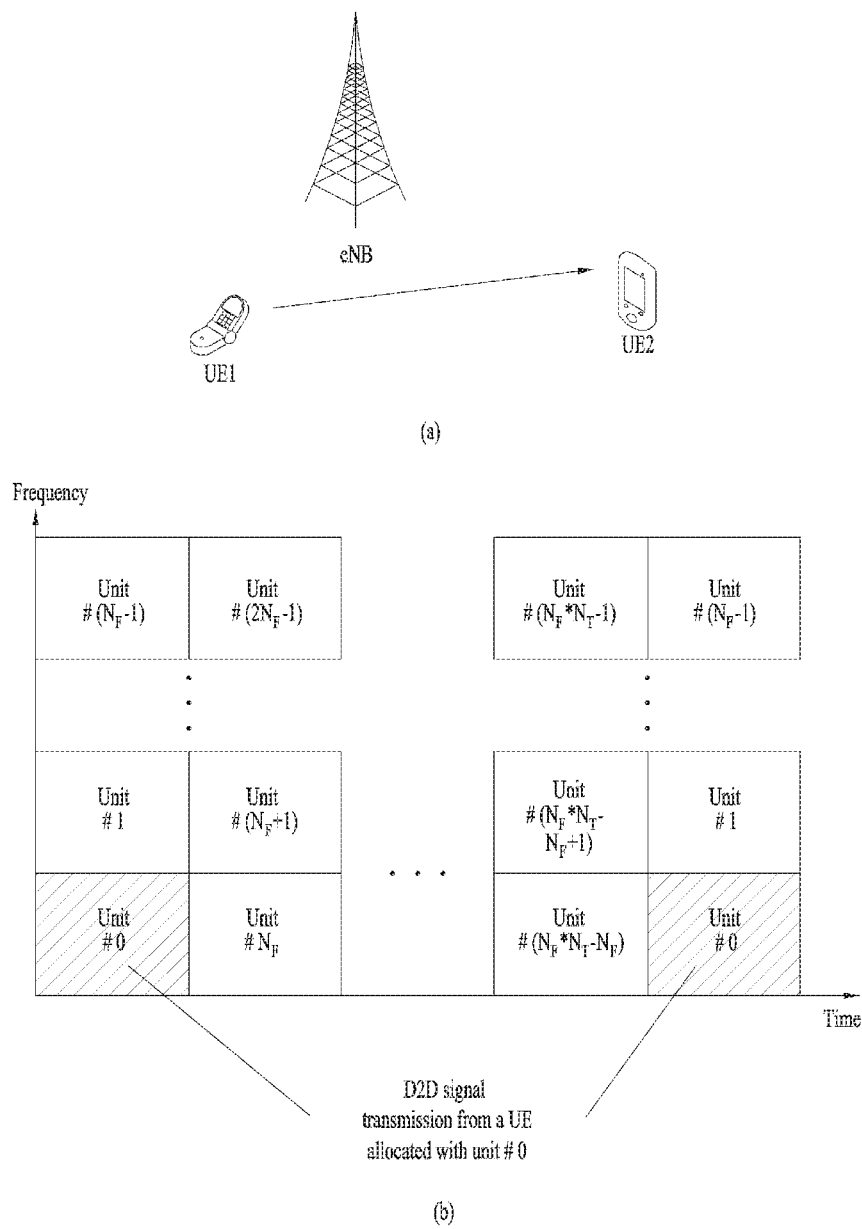
FIG. 8 is a view illustrating an exemplary D2D resource pool for D2D.

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

Figure 9:
FIG. 9 is a view illustrating a scheduling assignment (SA) period.

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to 1s set in a T-RPT bitmap in an indicated T-RPT and transmits one medium access control layer protocol data unit (MAC PDU) four times.

In V2V communication, a periodic type of cooperative awareness message (CAM) and an event-triggered type of decentralized environmental notification message (DENM) may be used. The CAM may include dynamic state information of a vehicle such as direction and speed, vehicle static data such as dimensions, and basic vehicle information such as ambient illumination states, path details, etc. The CAM may be 50 to 300 bytes long. In addition, the CAM is broadcast, and its latency should be less than 100 ms. The DENM may be generated upon occurrence of an unexpected incident such as a breakdown, an accident, etc. The DENM may be shorter than 3000 bytes, and it may be received by all vehicles within the transmission range. The DENM may have priority over the CAM. When it is said that messages are prioritized, it may mean that from the perspective of a UE, if there are a plurality of messages to be transmitted at the same time, a message with the highest priority is preferentially transmitted, or among the plurality of messages, the message with highest priority is transmitted earlier in time than other messages. From the perspective of multiple UEs, a high-priority message may be regarded to be less vulnerable to interference than a low-priority message, thereby reducing the probability of reception error. If security overhead is included in the CAM, the CAM may have a large message size compared to when there is no security overhead.

Figure 10:
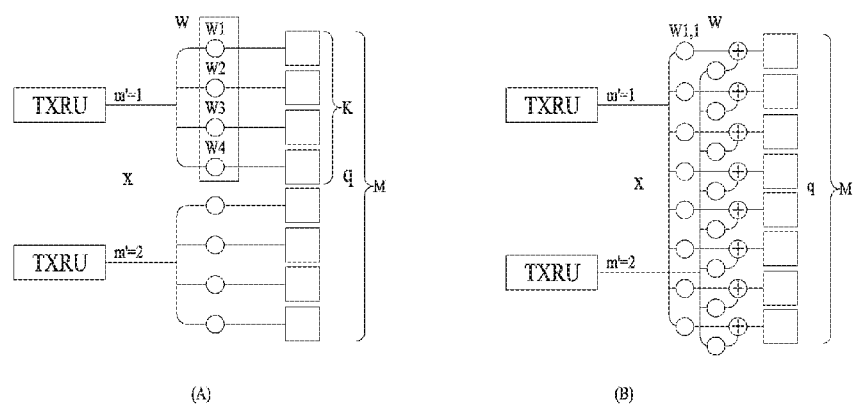
FIG. 10 illustrates examples of a connection scheme between TXRUs and antenna elements.

FIG. 10 illustrates examples of a connection scheme between TXRUs and antenna elements.

FIG. 10 (a) illustrates that TXRU is connected to a sub-array. In this case, the antenna elements are connected to only one TXRU. Unlike FIG. 10 (a), FIG. 10 (b) illustrates that TXRU is connected to all antenna elements. In this case, the antenna elements are connected to all TXRUs. In FIG. 10, W indicates a phase vector multiplied by an analog phase shifter. That is, a direction of analog beamforming is determined by W. In this case, mapping between CSI-RS antenna ports and TXRUs may be 1-to-1 or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as new RAT in the present invention.

Figure 11:
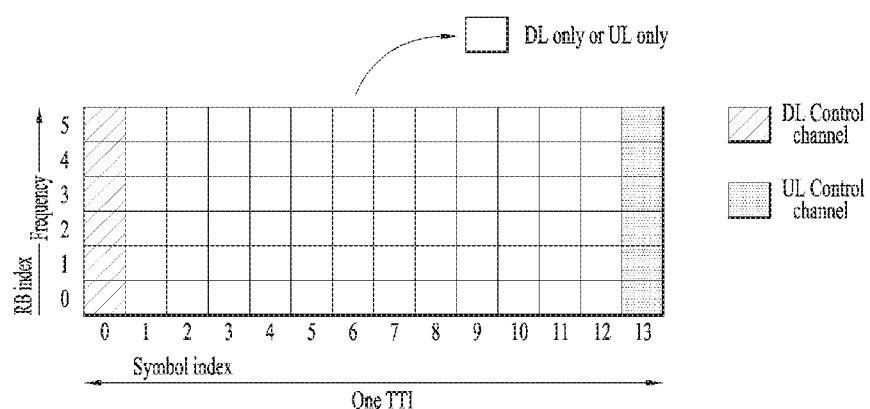
FIG. 11 illustrates an example of a self-contained subframe structure.

A self-contained subframe structure shown in FIG. 11 is considered in the fifth generation new RAT to minimize data transmission latency in a TDD system. FIG. 11 illustrates an example of a self-contained subframe structure.

In FIG. 11, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are set to a guard period.

Examples of the self-contained subframe type that may be configured in the system operating based on the new RAT may consider four subframe types as follows.
- downlink control period+downlink data period+GP+uplink control period
- downlink control period+downlink data period
- downlink control period+GP+uplink data period+uplink control period
- downlink control period+GP+uplink data period In the 5G new RAT, a signal transmission method may be changed depending on services or requirements. For example, in the case of enhanced mobile broadband (eMBB), the length of a transmission time unit may increase, whereas in the case of ultra-reliable and low latency communications (URLLC), the length of the transmission time unit may decrease.

In the URLLC, although there is an ongoing eMBB transmission, a URLLC signal may be transmitted on a corresponding resource depending on service types, and more particularly, in the case of an urgent service. Thus, from the perspective of a network or a UE, the URLLC transmission may be regarded as preemption of some resources for the eMBB transmission.

Due to the preemption, some resources for the eMBB transmission, where the length of the transmission time unit increase, may be punctured. In addition, the signal may be changed since it is superimposed with another signal, for example, a URLLC signal.

When the URLLC transmission occupies some resources for the eMBB transmission, a UE may fail to decode a specific code block (CB) for the eMBB transmission. In particular, even when a channel state is good, the resource preemption may cause the decoding failure of the specific CB. Therefore, the 5G new RAT may consider performing retransmission on a CB basis rather than a transport block (TB) basis.

Beamforming in mmW

In a millimeter wave (mmW) system, since a wavelength is shortened, a plurality of antenna elements can be installed in the same area. That is, considering that the wavelength in the 30 GHz band is 1 cm, a total of 64 (8×8) antenna elements may be installed in a 4 by 4 cm panel at intervals of 0.5 lambda (wavelength) in the case of a 2-dimensional array. Therefore, in the mmW system, it is attempted to improve coverage or throughput by increasing beamforming (BF) gain using multiple antenna elements.

If each antenna element is equipped with a transceiver unit (TXRU) to enable adjustment of transmission power and phases per antenna element, independent BF may be performed on each frequency resource. However, installing TXRUs in all about 100 antenna elements is less feasible in terms of cost. Therefore, a method of mapping a plurality of antenna elements to one TXRU and adjusting the direction of a beam using an analog phase shifter has been considered. However, such an analog BF method is disadvantageous in that frequency selective BF is impossible because only one beam direction is generated over the whole band.

As an intermediate form of digital BF and analog BF, hybrid BF with B TXRUs fewer than Q antenna elements may be considered. In the case of the hybrid BF, the number of beam directions that can be transmitted at the same time is limited to B or less although it depends on how the B TXRUs and the Q antenna elements are connected.

Relay Discovery

In the mmW (or mmWave) system, a link between UEs can be established only when a directional beam is used. That is, if an omni-directional antenna is used, the usage and effect of a UE discovery signal may be limited. Accordingly, in the mmW system, a UE discovery procedure may be performed based on the directional beam. In this case, due to the characteristics of the directional beam, only a specific UE (i.e., a UE in a specific direction) may receive the signal without any problems. In addition, in the mmW system, since blockage may be caused by other objects, it may be necessary to extend communication coverage through relaying. Two different UEs need to select an appropriate relay path to communicate with each other through relaying. To this end, the present disclosure proposes a procedure for discovering a relay UE and transmitting and receiving a signal after discovering the relay UE.

The present disclosure provides a method by which each UE transmits information on its discovered UE to neighboring UEs for each direction and/or location. Specifically, the present disclosure provides a method of transmitting discovery information (i.e., information on a discovered UE, and more specifically, a UE ID, the strength of a received signal, the energy of a received-signal resource, etc.) for each direction (per beam, antenna, or antenna group) and/or UE location through a physical layer signal or a higher layer signal to share the information with neighboring UEs.

When a UE receives a discovery signal, if the UE successfully decodes the discovery signal or if the received power of the discovery signal is more than or equal to a predetermined value, the UE transmits information on a discovered UE (e.g., the ID of the discovered UE, the direction in which the UE is discovered, information on the quality of the received signal, etc.) to neighboring UEs by including the information in a discovery signal or a data signal (i.e., a physical layer signal or a higher layer signal). If the number of bits of a field for transmitting the discovery signal is limited, the UE may transmit the information to the neighboring UEs from highest to lowest received signal strength (e.g., RSRP, information on signal strength similar thereto, etc.) or from highest to lowest average energy, which is measured in a region where the signal is received. For example, a UE may transmit information on its discovered UE (e.g., the ID of the discovered UE and/or information on a received beam) to neighboring UEs through a physical layer signal or a higher layer signal. In this case, the UE may transmit the information using a field for a discovery signal.

Upon receiving such information (i.e., discovery results made by another UE), a UE may select a relay path if the UE desires to transmit a packet but fails in discovery. In addition, the UE may transmit information on the index and direction of a beam on which a discovery signal is successfully received and information on an antenna (or an antenna group) to neighboring UEs. By informing the neighboring UEs of the direction in which a specific UE is discovered, the UE may allow the neighboring UEs to roughly know in which direction a destination UE is located. That is, the UE may assist the neighboring UEs in searching for a direction when a relay is re-selected or when the relay path is disconnected.

A UE (or second UE) may transmit a query discovery signal for checking whether a specific UE (or destination UE) is located nearby. When the UE (or second UE) fails to discover its destination UE within a one-hop range, the UE may transmit a signal for asking neighboring UEs whether the neighboring UEs have discovered the specific UE (or destination UE) through physical layer signaling or higher layer signaling in order to send a relay request to the neighboring UEs. In other words, the UE (or second UE) may transmit the discovery signal containing information on the specific UE (or destination UE) to check the location of the specific UE (or destination UE). Further, the query discovery signal may be transmitted in a specific direction in order to ask whether the destination UE is located in the specific direction.

Among the neighboring UEs that receive the query discovery signal, at least one UE (or first UE) may transmit a response signal to the UE (or second UE) which has transmitted the query discovery signal when discovering the specific UE with a corresponding destination ID. The response signal may contain information (e.g., the ID of the UE) indicating that the UE with the corresponding destination ID is discovered nearby and information (e.g., RSRP or RSRQ) on the quality of a signal used when the UE is discovered. The first UE may obtain the ID of the specific destination UE from the information on the specific destination UE included in the discovery signal transmitted from the second UE and check whether the UE with the obtained specific destination UE ID is discovered.

Further, an identification field (or first field) for distinguishing a query discovery signal and a normal discovery signal, which is used by a UE to inform neighboring UEs of the presence of the UE by transmitting its ID, may be included in a discovery signal. For example, when the identification field (or first field) is set to TRUE (or when the value of the first field is set to a first value), the discovery signal is determined as the query discovery signal and the ID included in the identification field (or the ID included in the discovery signal) is interpreted as the ID of a destination UE, which a UE desires to obtain. Otherwise (when the value of the first field is set to a second value), the ID included in the discovery signal may be interpreted as the ID of a transmitting UE.

A transmitting UE may perform blind transmission. That is, the transmitting UE may send a relay request to neighboring UEs after transmitting information on a destination UE (or relay request information including the ID of the destination UE) instead of directly selecting a relay (or relaying) UE. The transmitting UE may signal to the neighboring UEs information on the destination UE to which a packet should be delivered (i.e., relay request information including at least one of the destination UE ID and information on the beam/antenna/antenna group of the destination UE) through a physical layer signal or a higher layer signal. For example, when transmitting the packet, the transmitting UE may transmit the information on the destination UE that the packet should be delivered (or information on the destination UE ID) together with the packet or using a separate signal (for example, the destination information may be transmitted through a control signal). Thereafter, among the neighboring UEs that receive the information, a UE(s) recognizing (or detecting) that the destination UE (or destination UE ID) is within a one-hop range relays the corresponding packet. In this case, the neighboring UEs may not discover the corresponding destination UE. However, the neighboring UEs may discover the destination UE while they are moving. To enable a UE that receives the packet to be relayed to perform relaying in the above case, a rule may be defined such that the UE should store the packet in its buffer during a predetermined time from when the UE receives the packet. Alternatively, when the packet is initially transmitted, information on a request wait time (or latency requirement), that is, information about until when the packet should be delivered to the destination UE may also be transmitted. When receiving this information, the neighboring UEs may perform buffering of the corresponding packet until the lapse of the predetermined time in order to perform relaying.

If an ID obtained by performing discovery (or a UE ID detected from the discovery signal) matches with the information on the destination UE, UEs among the UEs that receive the information on the destination UE ID (or the relay request information containing the destination UE ID) may inform the UE that transmits the information on the destination UE ID (or the relay request information containing the destination UE ID) that it is capable of perform relaying. In this case, the UE transmitting the information on the destination UE ID (e.g., the UE that initially transmits the packet) may transmit a relay request signal to some or all of the UEs responding that relaying is possible. If the packet is relayed to the same destination UE, the transmitting UE (e.g., the UE that initially transmits the packet) may transmit information on a transmission resource to the relay UEs through a physical layer signal or a higher layer signal in order to allow the at least one UE that receive the relay request to use the same resource.

Figure 12:
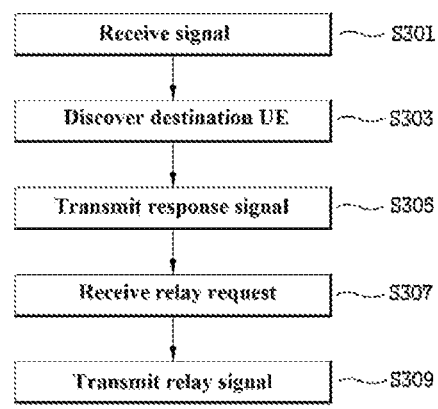
FIG. 12 is a diagram illustrating a method by which a UE performs relaying according to an embodiment of the present disclosure.

FIG. 12 is a diagram illustrating a method by which a UE performs relaying according to an embodiment of the present disclosure.

Referring to FIG. 12, a first UE may receive a signal transmitted from a second UE. The signal transmitted from the second UE may include information for requesting relay to a destination UE (relay request information) and be signaled through a physical layer signal or a higher layer signal (S301).

The first UE may determine whether the destination UE corresponding to a destination UE ID included in the relay request information, which the second UE desires to discover, is discovered or not. Specifically, the first UE monitors discovery signals transmitted from other UEs except the second UE and determines whether there is a discovery signal including a UE ID identical to the destination UE ID among the monitored discovery signals (S303).

According to an embodiment of the present disclosure, the first UE may determine whether the specific UE corresponding to the destination UE ID is discovered by monitoring discovery signals from other UEs during a predetermined time based on information on a request wait time included in the signal transmitted from the second UE. That is, the first UE may obtain the information on the request wait time from the received signal, which is transmitted from the second UE, and determine whether the destination UE is discovered by receiving discovery signals from neighboring UEs during the request wait time. In this case, the first UE may store the destination UE ID included in the relay request information in a buffer. Thereafter, by receiving the discovery signals transmitted from other UEs during the request wait time, the first UE may determine whether the destination UE corresponding to the destination UE ID is discovered. Meanwhile, when the first UE fails to discover the destination UE during the request wait time, the first UE transmits no response signal to the second UE.

When detecting a discovery signal including ID information corresponding to the destination UE ID (or discovering the destination UE), the first UE may transmit a response signal to the second UE. In this case, the response signal may be transmitted to the second UE through a physical layer signal or a higher layer signal (S305).

In addition, the first UE may include information on the quality of the signal related to the destination UE ID in the response signal to transmit the information to the second UE. To this end, the first UE may measure the quality (e.g., RSSI, RSRP or RSRQ) of the signal (e.g., discovery signal) related to the destination UE ID. The first UE may transmit the response signal by including the measured signal quality therein to the second UE.

Meanwhile, when the first UE fails to discover the destination UE corresponding to the destination UE ID, the first UE does not transmit the response signal to the second UE. When the discovery signal does not include the relay request information containing the destination UE ID, the first UE may not transmit the response signal to the second UE.

Next, the first UE may receive a relay request signal from the second UE. That is, by receiving the response signal, the second UE may check that the first UE discovers the destination UE and is capable of performing relaying. Then, the second UE may transmit the relay request signal to the first UE. The relay request signal may include at least one of data information such as a packet to be transmitted to the destination UE and information on a resource required for the first UE to transmit a relay signal to the destination UE (S307).

Meanwhile, the second UE may receive a plurality of response signals from a plurality of UEs. In this case, if each of the response signals includes signal quality information, the second UE may select at least one UE from among the plurality of UEs based on the signal quality information and then transmit the relay request signal to the selected at least one UE. For example, the second UE may compare signal strength included in all of the signal quality information included in the plurality of response signals, select a UE that transmits a response signal with the highest signal strength, and then transmit the relay request signal to the selected UE.

Upon receiving the relay request signal from the second UE, the first UE may transmit the relay signal including the data information, for example, the packet included in the relay request signal to the destination UE. When the relay request signal includes the information on the transmission resource, the first UE may transmit to the destination UE the relay signal on the transmission resource (S309).

Meanwhile, the second UE signal may further include a first field for indicating whether the relay request information is included in the relay request signal. For example, the signal may include information on a UE ID. Based on the first field, the first UE may identify either that the signal carries information for requesting relay to a UE corresponding to the UE ID or that the signal carries the UE ID simply as information on a specific UE. That is, when the ID information is included in the signal, the first UE may know, based on the first field, that the signal carries the relay request information for requesting the relay to the UE corresponding to the ID information.

That is, the first field may be set to either a first value indicating that the UE ID included in the signal transmitted from the second UE is the ID of the destination UE that the second UE desires to discover or a second value indicating that the signal simply includes information on the UE ID. For example, when the signal received from the second UE is a discovery signal and the first field is set to the first value (when it is determined that the relay request information is included), the first UE may determine that the discovery signal transmitted from the second UE is a query discovery signal for asking whether the specific UE (i.e., destination UE) is discovered and requesting relay thereto. On the contrary, when the first field is set to the second value, the first UE may determine that the discovery signal transmitted from the second UE is a normal discovery signal for informing the presence of the second UE.

Discovery Signal Transmission and Reception Method

Each UE may transmit a discovery signal for informing its presence to other UEs with a predetermined periodicity. Accordingly, the present disclosure proposes methods of configuring a beam direction for transmitting a discovery signal and a resource for the discovery signal.

First, the present disclosure proposes a method of transmitting a discovery signal in a direction in which many discovery signals are received in a discovery resource region. To this end, UEs (first and/or second UEs) may measure the ratio of resources in a discovery signal resource region (or discovery resource region) where a discovery signal equal to or higher than a predetermined threshold is received (discovery channel busy ratio (DCBR)) for each beam direction and then transmit their discovery signals in a (beam) direction with a high DCBR. For example, the predetermined threshold may correspond to signal strength on a resource (e.g., RSSI, RSRP or RSRQ). If the DCBR for a specific direction is high, a resource collision may occur. Thus, each UE selects a suitable resource through sensing and performs semi-persistent transmission, that is, maintains the corresponding resource during a predetermined time.

Alternatively, it may be considered that a UE first selects a direction with a high DCBR and then selects a resource for the corresponding direction randomly or autonomously depending on UE implementation. According to this method, even though there occurs a collision or half-duplex problem, such a problem can be solved in a next discovery period since a different resource is selected every discovery period.

By considering such a congestion level and transmitting a beam in a corresponding direction first, it is possible to discover a UE more rapidly.

In other words, a first or second UE may measure the ratio of resources (DCBR) in a discovery signal resource region (or discovery resource region) where a discovery signal equal to or higher than the predetermined threshold is received for each beam direction. When transmitting its discovery signal, the first or second UE may determine the transmission direction of the discovery signal based on the DCBR value measured for each beam direction. For example, the first or second UE may transmit the discovery signal in a direction where the highest DCBR is measured.

Although a discovery signal may be transmitted in a direction with a high DCBR first, the discovery signal may be transmitted uniformly in all directions and the transmission order of the discovery signal may be changed. For example, when a UE attempts to transmit its discovery signal in a total of N analog beam directions, the UE may determine the beam directions in descending order of DCBRs. The purpose of this method is to discover a UE in a direction where many UEs are expected to be present.

Meanwhile, if the DCBR has a significantly high value, a number of UEs may perform transmission so that a resource collision may occur. In this case, it is preferable not to perform transmission in a corresponding direction. To this end, the present disclosure proposes not to perform transmission in a direction where the DCBR is more than a predetermined threshold or to limit the number of times of transmission performed during a predetermined time. To this end, a network may configure a CR limit (the ratio of resources occupied during a predetermined time) in each DCBR (range).

For example, assuming that the highest, second highest, and third highest DCBRs are measured in second, third, and first directions, respectively, a UE may transmit its discovery signal in a direction with the highest DCBR first (i.e., in the following order: the second direction, the third direction, and the first direction). However, if the DCBR in the second direction is higher than a predetermined first threshold, the UE does not transmit the discovery signal in the second direction. That is, the UE may transmit the discovery signal in the following order: the third direction and the first direction except the second direction.

It is proposed to use a semi-directive transmission scheme of using beamforming in a specific direction for transmission and using an omni-directional antenna for reception when a signal is transmitted to multiple unspecific UEs in the mmW system (for example, in the case of a discovery signal).

In the mmW system, a maximum link gain may be obtained when beam matching is accurately achieved between a transmitter and a receiver. However, if two UEs perform beam sweeping whenever they exchange a signal, sweeping overhead may significantly increase. Thus, transmission is repeated multiple times, but a different beam is used for each transmission to obtain a transmission beam gain. The receiver performs omni-directional reception (i.e., attempts to receive signals in the omni-direction) to receive signals from more UEs.

Considering UE operation on a specific discovery resource, a UE may first select a transmission resource for a specific direction and then perform transmission in a corresponding subframe (SF). Since reception is performed in the rest of a discovery resource region except the transmission resource, a reception beam is omni-directional.

In addition, a UE may perform access by considering the amount of loads/discoveries for each direction. For example, a specific UE may discover more UEs in a specific direction. In addition, when the UE moves, the number of UEs discovered in the specific direction may be variable. The direction of a transmission beam is determined by measuring a DCBR as described above, and it may also be determined from the perspective of a reception UE. Each UE broadcasts its measured DCBR to neighboring UEs periodically/aperiodically, and a transmitting UE may determine its beam direction as a direction having a low DCBR broadcast by a receiving UE and then perform transmission. The purpose of this method is to transmit a signal in a direction where a channel is less busy in order to allow a receiving UE to receive the signal better (i.e., with a low collision probability).

The present disclosure is not limited to direct communication between UEs. That is, the disclosure may be used for uplink or downlink communication, and in this case, the proposed methods may be used by a BS, a relay node, etc.

Since each of the examples of the proposed methods may be included as one method for implementing the present disclosure, it is apparent that each example can be regarded as a proposed method. In addition, although the proposed methods can be implemented independently, some of the proposed methods can be combined (or merged) for implementation. Moreover, a rule may be defined such that information on whether the proposed methods are applied (or information on rules related to the proposed methods) should be transmitted from a BS to a UE through a predefined signal (e.g., a physical layer signal, a higher layer signal, etc.).

Figure 13:
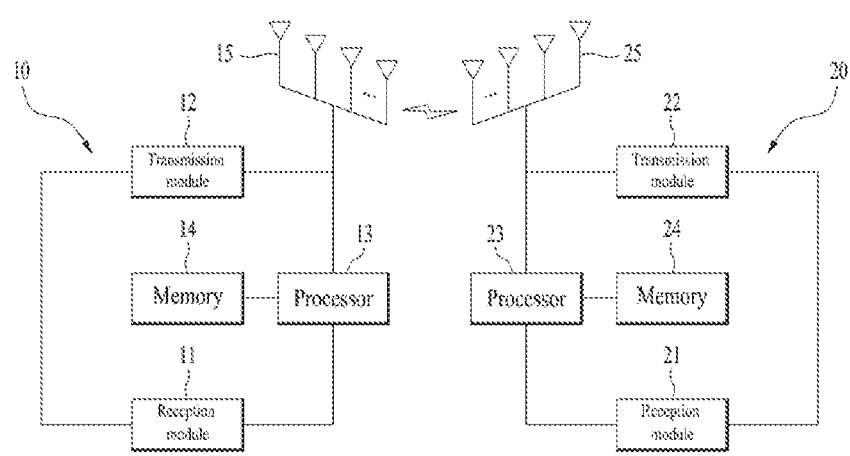
FIG. 13 is a block diagram of a transmission point and a UE according to an embodiment of the present disclosure.

FIG. 13 is a block diagram of a transmission point and a UE according to an embodiment of the present disclosure Referring to FIG. 13, a transmission point 10 according to the present disclosure may include a receiver 13, a transmitter 12, a processor 13, a memory 14, and a plurality of antennas 15. Use of the plurality of antennas 15 means that the transmission point 10 supports MIMO transmission and reception. The receiver 11 may receive various UL signals, data, and information from a UE. The transmitter 12 may transmit various DL signals, data, and information to a UE. The processor 13 may provide overall control to the transmission point 10. The processor 13 of the transmission point 10 according to an embodiment of the present disclosure may process requirements for each of the foregoing embodiments.

The processor 23 of the UE 20 according to an embodiment of the present invention can process the necessary items in each of the above-described embodiments.

The processor 23 of the UE 20 may also perform a function of computationally processing information received by the UE 20 and information to be transmitted to the outside, and the memory 24 may store the computationally processed information and the like for a predetermined time and may be replaced by a component such as a buffer (not shown).

The specific configuration of the transmission point apparatus and the UE may be implemented such that the details described in the various embodiments of the present invention may be applied independently or implemented such that two or more of the embodiments are applied at the same time. For clarity, redundant description is omitted In the example of FIG. 13, the description of the transmission point apparatus 10 may also be applied to a relay device as a downlink transmission entity or an uplink reception entity, and the description of the UE 20 may also be applied to a relay device as a downlink reception entity or an uplink transmission entity.

The embodiments of the present invention may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

The invention claimed is:

1. A method of performing device-to-device (D2D) relay communication by a first user equipment (UE) in a wireless communication system, the method comprising:
receiving a signal including relay request information from a second UE;
when a destination UE corresponding to a destination UE ID included in the relay request information is discovered, transmitting a response signal to the second UE; and
transmitting a relay signal to the destination UE, wherein the signal includes a first field indicating whether the relay information is included, wherein when the first field is set to a first value, the relay request information includes the destination UE ID that the second UE desires to discover, and wherein when the first field is set to a second value, the relay request information includes a UE ID of the second UE.

2. The method of claim 1, wherein the relay request information further includes information on a request wait time, and wherein the first UE determines whether the destination UE is discovered during the request wait time.

3. The method of claim 1, wherein when detecting a discovery signal including a UE ID identical to the destination UE ID, the first UE determines that the destination UE is discovered.

4. The method of claim 1, wherein when a relay request signal transmitted from the second UE is received in response to the response signal, the relay signal is transmitted to the destination UE.

5. The method of claim 4, wherein the relay request signal includes information on a transmission resource for transmitting the relay signal.

6. The method of claim 1, wherein the relay request information includes information on at least one of a beam, an antenna, and an antenna group of the destination UE.

7. The method of claim 1, wherein the response signal further includes signal quality information including at least one of reference signal received power (RSRP) and reference signal received quality (RSRQ) of a signal related to the discovered destination UE.

8. The method of claim 1, wherein the signal transmitted from the second UE corresponds to a discovery signal.

9. The method of claim 1, wherein the signal is beamformed in a specific direction and transmitted.

10. The method of claim 1, further comprising:
measuring a discovery channel busy ratio (DCBR) indicating a ratio of resources on which discovery signals are received in each signal direction; and
determining a transmission direction of a discovery signal based on the DCBR.

11. A user equipment (UE) for performing device-to-device (D2D) relay communication in a wireless communication system, the UE comprising:
a transceiver; and
a processor configured to:
control the transceiver to receive a signal including relay request information from a transmitting UE;
control the transceiver to transmit a response signal to the transmitting UE when a destination UE corresponding to a destination UE ID included in the relay request information is discovered; and
control the transceiver to transmit a relay signal to the destination UE,
wherein the signal includes a first field indicating whether the relay information is included,
wherein when the first field is set to a first value, the relay request information includes the destination UE ID that the second UE desires to discover, and
wherein when the first field is set to a second value, the relay request information includes a UE ID of the second UE.

* * * * *